(12) United States Patent
Erestam (10) Patent No.: US 10,540,728 B2
(45) Date of Patent: Jan. 21, 2020

(54) LOCATING SUBSTITUTE CONSTRUCTION TOOLS WITHIN A CONSTRUCTION WORKSITE

(71) Applicant: HUSQVARNA AB, Huskvarna (SE)

(72) Inventor: Anders Erestam, Göteborg (SE)

(73) Assignee: HUSQVARNA AB, Huskvarna (SE)

( * ) Notice: Subject to any disclaimer, the term of this patent is extended or adjusted under 35 U.S.C. 154(b) by 169 days.

(21) Appl. No.: 15/451,948

(22) Filed: Mar. 7, 2017

(65) Prior Publication Data

US 2017/0262947 A1    Sep. 14, 2017

(30) Foreign Application Priority Data

Mar. 9, 2016 (SE) .................................. 16503203

(51) Int. Cl.
*G06Q 50/08* (2012.01)
*G01S 5/00* (2006.01)
*G06Q 10/06* (2012.01)
*G06Q 10/08* (2012.01)

(52) U.S. Cl.
CPC ............ *G06Q 50/08* (2013.01); *G01S 5/0009* (2013.01); *G06Q 10/06313* (2013.01); *G06Q 10/087* (2013.01)

(58) Field of Classification Search
CPC ...... G06Q 10/087; G06Q 10/06; G06Q 50/08; H01M 10/4257; H01M 2010/4271
See application file for complete search history.

(56) References Cited

U.S. PATENT DOCUMENTS

| 5,455,409 | A  | * | 10/1995 | Smith | G06K 17/00 235/385 |
| 5,933,353 | A  | * | 8/1999 | Abriam | G05B 19/4097 700/171 |
| 6,014,597 | A  | * | 1/2000 | Kochanneck | B60K 1/04 701/22 |
| 6,084,523 | A  | * | 7/2000 | Gelnovatch | G01R 31/3648 340/636.1 |
| 6,775,562 | B1 | * | 8/2004 | Owens | H04M 19/08 455/572 |
| 7,123,149 | B2 | * | 10/2006 | Nowak | G06K 17/0022 340/572.1 |
| 7,283,047 | B2 | * | 10/2007 | Culpepper | B60R 25/102 340/539.13 |

(Continued)

FOREIGN PATENT DOCUMENTS

EP    2680093 A2    1/2014

OTHER PUBLICATIONS

McKinney, Rob, Apps to Manage and Track Tools for Construction Conappguru.com, Aug. 1, 2016 (Year: 2016).*

(Continued)

*Primary Examiner* — Scott L Jarrett
(74) *Attorney, Agent, or Firm* — Burr & Forman, LLP (57) ABSTRACT

A construction site status monitoring device comprising processing circuitry configured to generate a construction device availability request including an indicator of a device type, in response to an initiating event including an indicator of a device type, and receive a construction device availability response including location data and status information of at least one available construction device of the device type based on the construction device availability request.

15 Claims, 8 Drawing Sheets

(56) References Cited

U.S. PATENT DOCUMENTS

| | | | | |
|---|---|---|---|---|
| 7,346,422 B2* | 3/2008 | Tsuchiya | B23D 59/008 | |
| | | | | 700/168 |
| 7,576,517 B1* | 8/2009 | Cotton | H01M 10/482 | |
| | | | | 320/136 |
| 7,598,880 B2* | 10/2009 | Powell | G01R 31/3648 | |
| | | | | 340/636.1 |
| 7,627,427 B2* | 12/2009 | Nichols | G01C 21/20 | |
| | | | | 701/517 |
| 7,715,884 B2* | 5/2010 | Book | H02J 7/0003 | |
| | | | | 455/572 |
| 7,805,263 B2* | 9/2010 | Mack | A61N 1/3708 | |
| | | | | 702/63 |
| 7,911,379 B2* | 3/2011 | Cameron | G06Q 10/087 | |
| | | | | 342/357.28 |
| 7,928,845 B1* | 4/2011 | LaRosa | G08B 13/1427 | |
| | | | | 340/539.21 |
| 8,131,486 B2* | 3/2012 | Leonard | H01M 10/482 | |
| | | | | 702/63 |
| 8,169,298 B2* | 5/2012 | Wiesner | B25F 5/00 | |
| | | | | 340/10.33 |
| 8,294,424 B2* | 10/2012 | Bucur | G01R 31/396 | |
| | | | | 320/116 |
| 8,862,388 B2* | 10/2014 | Wu | B60L 1/003 | |
| | | | | 701/22 |
| 9,031,585 B2* | 5/2015 | Kahle | G01C 15/00 | |
| | | | | 455/457 |
| 9,043,402 B2* | 5/2015 | Fosburgh | G06F 11/3013 | |
| | | | | 709/205 |
| 9,060,213 B2* | 6/2015 | Jones | B60R 25/33 | |
| 9,123,035 B2* | 9/2015 | Penilla | G06Q 20/18 | |
| 9,430,370 B2* | 8/2016 | Mergener | G06F 12/023 | |
| 9,525,976 B2* | 12/2016 | Dharwada | H04W 4/20 | |
| 9,726,763 B2* | 8/2017 | Dempsey | G01S 17/89 | |
| 9,756,402 B2* | 9/2017 | Stampfl | B25B 21/00 | |
| 9,877,266 B1* | 1/2018 | Knas | H04W 40/244 | |
| 9,983,312 B2* | 5/2018 | Dempsey | G01S 17/89 | |
| 10,013,678 B2* | 7/2018 | Matsuyama | H01M 10/48 | |
| 10,149,142 B2* | 12/2018 | Coulis | H04W 76/10 | |
| 10,339,496 B2* | 7/2019 | Matson | G06F 3/0482 | |
| 10,379,167 B2* | 8/2019 | Newport | A61N 1/3931 | |
| 10,380,883 B2* | 8/2019 | Matson | G08C 17/02 | |
| 2005/0187833 A1* | 8/2005 | Royer | G06Q 10/087 | |
| | | | | 705/28 |
| 2007/0120736 A1* | 5/2007 | MacKenzie | G01S 13/825 | |
| | | | | 342/357.66 |
| 2007/0174065 A1* | 7/2007 | Richter | B66B 5/0025 | |
| | | | | 187/391 |
| 2007/0239569 A1* | 10/2007 | Lucas | G06Q 10/08 | |
| | | | | 705/28 |
| 2008/0281664 A1* | 11/2008 | Campbell | G06Q 10/02 | |
| | | | | 705/5 |
| 2010/0085008 A1* | 4/2010 | Suzuki | B25F 5/00 | |
| | | | | 320/112 |
| 2010/0277277 A1* | 11/2010 | Green | G07C 9/00111 | |
| | | | | 340/5.72 |
| 2010/0299172 A1* | 11/2010 | Nottoli | G06Q 10/06 | |
| | | | | 705/7.18 |
| 2010/0324955 A1 | 12/2010 | Rinehart et al. | | |
| 2011/0106561 A1* | 5/2011 | Eaton, Jr. | G06Q 10/087 | |
| | | | | 705/3 |
| 2011/0106576 A1* | 5/2011 | Hou | G06Q 10/02 | |
| | | | | 705/7.12 |
| 2011/0191233 A1* | 8/2011 | Russo | G06Q 40/04 | |
| | | | | 705/37 |
| 2011/0270679 A1* | 11/2011 | Tziortzis | G06Q 30/02 | |
| | | | | 705/14.58 |
| 2012/0078444 A1* | 3/2012 | Mase | G06F 21/88 | |
| | | | | 701/2 |
| 2012/0182132 A1* | 7/2012 | McShane | H01M 10/488 | |
| | | | | 340/10.51 |
| 2012/0209470 A1* | 8/2012 | Gilbert | G06Q 10/087 | |
| | | | | 701/31.4 |
| 2012/0267134 A1* | 10/2012 | Matthias | B25F 5/021 | |
| | | | | 173/2 |
| 2013/0054080 A1* | 2/2013 | Jacobson | G07C 9/00039 | |
| | | | | 701/29.3 |
| 2013/0109375 A1* | 5/2013 | Zeiler | H04W 4/029 | |
| | | | | 455/426.1 |
| 2013/0127611 A1* | 5/2013 | Bernstein | G08B 21/18 | |
| | | | | 340/455 |
| 2013/0138606 A1* | 5/2013 | Kahle | G06Q 10/06 | |
| | | | | 707/609 |
| 2013/0211976 A1* | 8/2013 | Breed | G06Q 10/06 | |
| | | | | 705/28 |
| 2013/0332370 A1* | 12/2013 | Hyde | B60W 10/26 | |
| | | | | 705/306 |
| 2014/0070924 A1* | 3/2014 | Wenger | B25F 5/00 | |
| | | | | 340/10.1 |
| 2014/0131434 A1* | 5/2014 | Ozkan | G06Q 10/087 | |
| | | | | 235/375 |
| 2014/0184397 A1* | 7/2014 | Volpert | B25F 5/00 | |
| | | | | 340/12.51 |
| 2014/0213301 A1* | 7/2014 | Evans | H04W 4/21 | |
| | | | | 455/456.3 |
| 2014/0350716 A1* | 11/2014 | Fly | G06F 1/3212 | |
| | | | | 700/215 |
| 2015/0084745 A1* | 3/2015 | Hertz | H04W 4/12 | |
| | | | | 340/10.3 |
| 2016/0025506 A1* | 1/2016 | Penilla | G06Q 20/18 | |
| | | | | 701/430 |
| 2016/0092847 A1* | 3/2016 | Buchbinder | G06Q 10/20 | |
| | | | | 705/26.8 |
| 2016/0210688 A1* | 7/2016 | Stannard et al. | G06Q 10/063114 | |
| 2016/0277879 A1* | 9/2016 | Daoura | H04W 4/80 | |
| 2017/0046799 A1* | 2/2017 | Chan | G06Q 20/0655 | |
| 2017/0111247 A1* | 4/2017 | Uchiyama | H04L 43/0805 | |
| 2017/0222382 A1* | 8/2017 | Peloquin | B25F 5/00 | |
| 2017/0256006 A1* | 9/2017 | Erestam | G06Q 50/08 | |
| 2017/0262779 A1* | 9/2017 | Remaker | G06Q 10/06313 | |
| 2018/0010919 A1* | 1/2018 | Huang | G01C 21/3469 | |
| 2018/0141453 A1* | 5/2018 | High | B60L 11/1822 | |

OTHER PUBLICATIONS

Marshall, Chris, DeWalt Tool Connect Battery App Woodworkers Journal, Sep. 15, 2015 (Year: 2015).*

DeWalt Tool Connect—product brochure DeWalt, 2017 (Year: 2017).*

Liszekski, Andrew, DeWalt's Bluetooth Batteries Can Be Shut Down to Deter Tool Thieves Gizmodo.com, Jun. 10, 2015 (Year: 2015).*

Hilti On!Track User Manual version 1.1 Hilti, Aug. 2016 (Year: 2016).*

Amstutz, Jay, Tool Tracking Lost & Found with One-Key Coptool. com, Mar. 17, 2016 (Year: 2016).*

Gigatrak—Tool Tracking System—web pages Gigatrck.com, Dec. 2, 2015, Retrieved from Archive.org Nov. 13, 2018 (Year: 2015).*

Trimble AllTrak Cloud datasheet Trimble, 2016 (Year: 2016).*

Trimble AllTrak—Take Control of Your Assets Trimble, 2009 (Year: 2009).*

Trimble AllTrk—Quick Start Guide Trimble, Nov. 2012 (Year: 2012).*

* cited by examiner

LOCATING SUBSTITUTE CONSTRUCTION TOOLS WITHIN A CONSTRUCTION WORKSITE

CROSS REFERENCE TO RELATED APPLICATIONS

This application claims priority to Swedish application number 1650320-3 filed Mar. 9, 2016, the entire contents of which are hereby incorporated by reference in its entirety.

TECHNICAL FIELD

Example embodiments generally relate to construction equipment and, more particularly, relate to determining a nearby construction device availability.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like.

In some instances, a construction device may malfunction, be in need of maintenance, or otherwise be removed from service at a construction site. An operator may desire to continue using the same or similar construction device to continue a construction operation, such as drilling, cutting, driving nails, or the like. The operator may be forced to search the construction site, storage locations, construction vehicles or the like, to locate a suitable substitute construction device. Searching for substitute devices may waste valuable work time, which may in some instances, be compounded when subsequent construction operations depend on completion of the current construction operation.

BRIEF SUMMARY OF SOME EXAMPLES

In an example embodiment, a construction site status monitoring device comprising processing circuitry configured to generate a construction device availability request including an indicator of a device type, in response to an initiating event and receive a construction device availability response including location data and status information of at least one available construction device of the device type based on the construction device availability request.

In another example embodiment, a construction site status monitoring device comprising processing circuitry configured to receive a construction device availability request, including an indicator of a device type, in response to an initiating event and generate a construction device availability response including location data and status information of at least one available construction device of the device type based on the construction device availability request.

In yet a further example embodiment, a construction site status monitoring system comprising a plurality of construction devices and a construction site status monitoring device. The construction site status monitoring device includes processing circuitry configured to generate a construction device availability request including an indicator of a device type, in response to an initiating event associated with a first construction device of the plurality of construction devices and receive a construction device availability response including location data and status information of at least one available construction device of the device type, from the plurality of construction devices, based on the construction device availability request.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different construction devices. The construction site status monitoring device may receive device identifier data and location data from a plurality of construction devices. The construction site status monitoring device may determine substitute devices for the construction devices, for example if a construction device is limited in operation, malfunctions, fails, requires maintenance, or is otherwise limited or removed from service.

In some embodiments, the construction site status monitoring device may receive sensor data, such as diagnostic data, run time, temperature, vibration, or the like, indicative of the operation of the construction device. The sensor data may be utilized to determine an operational condition of the construction device, such as fully operational, limited operation, removed from operation. Additionally or alternatively, the operational status may include "in use," "idle," "available," or the like, which may enable the construction site status monitoring device to determine substitute devices based on current use of the construction devices. The determination of a substitute construction device may be in response to a construction device availability request generated by the construction device or the construction site status monitoring device based on sensor data from the construction device and/or a user request.

In an example embodiment, the construction device device identifier data and location data may not be limited to a specific construction site. In some instances, the device identifiers and location data may be received from construction devices in wire or wireless communication to a network, such as a neighboring construction site, a neighbor's home, construction vehicle, remote construction site of the same or different organization, or retail locations. In some instances the construction device device identifier data and/or location data may be received by the construction site monitoring device in response to a construction device availability request.

In an example embodiment, a substitute device location and/or identification, e.g. a construction device availability response may be displayed on a user interface upon request or automatically, in an instance in which limited operation of the construction device is determined.

Figure 1:
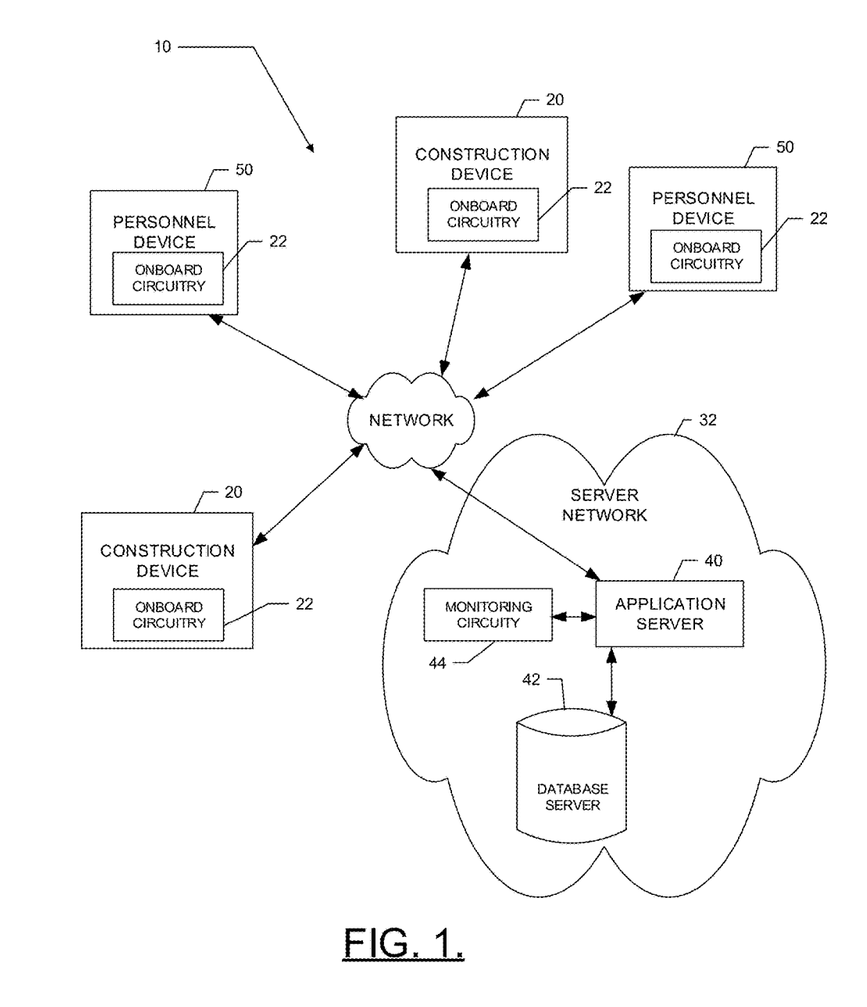
FIG. 1 illustrates a block diagram of a system according to an example embodiment.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20 and personnel devices 50). Notably, although FIG. 1 illustrates four devices 20, 50 it should be appreciated that many more devices 20, 50 may be included in some embodiments and thus, the four devices 20, 50 of FIG. 1 are simply used to illustrate a multiplicity of devices 20, 50 and the number of devices 20, 50 is in no way limiting to other example embodiments. In this regard, example embodiments are scalable to inclusion of any number of devices 20, 50 being tied into the system 10. Moreover, it should be appreciated that FIG. 1 illustrates one example embodiment in which shared resources may be allocated within a community of networked devices (e.g. devices 20, 50). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of devices 20, 50 that are associated with corresponding specific servers that belong to or are utilized by a particular organization, entity or group over a single network (e.g. network 30). However, in other embodiments, multiple different sets of devices 20, 50 may be enabled to access other servers associated with different organizations, entities or groups via the same or a different network.

The devices 20, 50 may, in some cases, each include sensory, computing and/or communication devices associated with different devices 20, 50 that belong to or are associated with a single organization, for example fleet management of devices 20, 50 at a construction site. In another example, a first device 20, 50 may be associated with a first facility or location of a first organization. Meanwhile, a second device may be associated with a second facility or location of the first organization. As such, for example, some of the devices 20, 50 may be associated with the first organization, while other ones of the devices 20, 50 are associated with a second organization. Thus, for example, the devices 20, 50 may be remotely located from each other, collocated, or combinations thereof. However, in some embodiments, each of the devices 20, 50 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The work element may be operated via the power unit to perform construction operations, such as drilling, cutting, demolishing, nailing, or the like. Various example types of construction devices 20 with which example embodiments may be associated should be understood to have corresponding different types of working elements (e.g. blades, cutting chains, drill bits, nailers, or the like). The construction devices 20 may include sensors for monitoring location, device operation, orientation, or the like, as discussed below in reference to FIG. 2.

Figure 2:
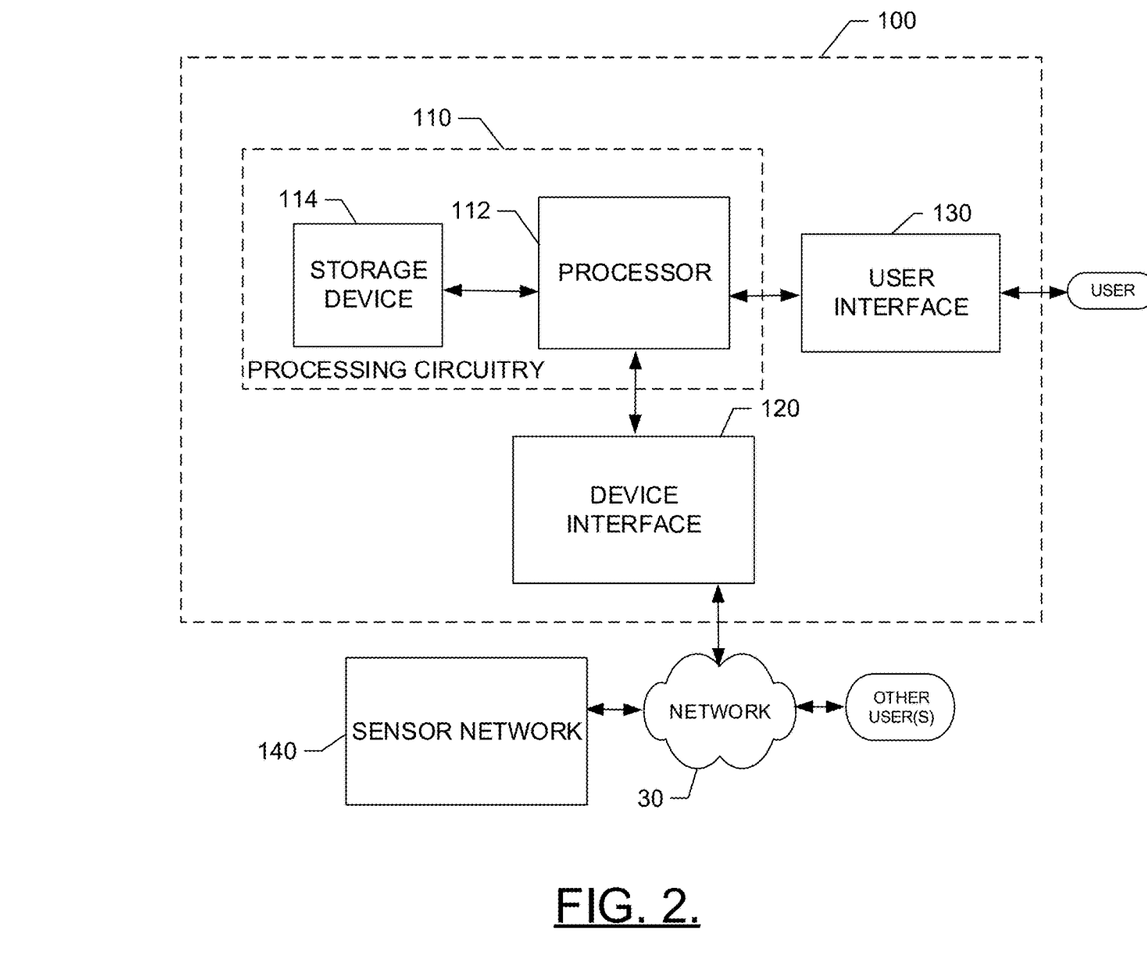
FIG. 2 illustrates a block diagram of one example of onboard electronics or monitoring circuitry that may be used in connection with employment of an example embodiment.

Each of the personnel devices 50 may include sensors, such as location sensors, cameras, scanners, or the like and/or a user interface, as discussed below in reference to FIG. 2.

In an example embodiment, each of the devices 20, 50 may include onboard circuitry 22 which may include or otherwise be embodied as a computing device (e.g. a processor, microcontroller, processing circuitry, or the like) capable of communication with a network 30. As such, for example, each one of the devices 20, 50 may include (or otherwise have access to) memory for storing instructions or applications for the performance of various functions and a corresponding processor for executing stored instructions or applications and a corresponding processor or processing circuitry. Each one of the devices 20, 50 may also include software and/or corresponding hardware (e.g. the onboard circuitry 22) for enabling the performance of the respective functions of the clients as described below. In an example embodiment, one or more of the devices 20, 50 may be configured to execute applications or functions implemented via software for enabling a respective one of the devices 20, 50 to communicate with the network 30 for requesting and/or receiving information and/or services via the network 30 and/or for providing data to other devices via the network 30. The information or services receivable at the devices 20, 50 may include deliverable components (e.g. downloadable software to configure the onboard circuitry 22 of the devices 20, 50, or information for consumption or utilization at the onboard circuitry 22 of the devices 20, 50).

The network 30 may be a data network, such as a local area network (LAN), a metropolitan area network (MAN), a wide area network (WAN) (e.g. the Internet), and/or the like, which may couple the devices 20, 50 to devices such as processing elements (e.g. personal computers, server computers or the like) and/or databases. Communication between the network 30, the devices 20, 50 and the devices or databases (e.g. servers) to which the devices 20, 50 are coupled may be accomplished by either wired or wireless communication mechanisms and corresponding communication protocols.

In an example embodiment, other devices to which the devices 20, 50 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the devices 20, 50) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to substitute device identification, as will be described in greater detail below. For example, the application server 40 may be local or remote and configured to receive data from the devices 20, 50 and process the data to coordinate construction site operations, as described herein. Thus, for example, the onboard circuitry 22 may be configured to send the data to the application server 40 for the application server to coordinate construction site operations (e.g. monitor and/or deploy personnel and/or device 20, 50 to locations throughout the construction site), or have actions associated therewith (e.g. send information, alerts, or safety interlocks to devices 20, 50). In some embodiments, the application server 40 may be configured to provide devices 20, 50 with instructions (e.g. for execution by the onboard circuitry 22) for taking prescribed actions when corresponding substitute device are identified.

Accordingly, in some example embodiments, data from devices 20, 50 may be provided to and analyzed at the application server 40 to identify or define a construction site status (CSS) (e.g. in real time or at a later time). The CSS may be associated with actions to be taken by the corresponding one of the devices 20, 50 that sent the data (or another device within the construction site) in response to a future detection of the CSS. The application server 40 may then equip one or more of the devices 20, 50 to detect the defined CSS in the future, and also provide instructions for actions to be taken when the defined CSS is encountered. Each one of the devices 20, 50 that has received the instructions may then detect the defined CSS and take the appropriate action. In one example embodiment, for example, the CSS may include the identification of a substitute device for a construction device and in some instances providing the location data of the substitute device to an operator by causing the location data of the substitute device to be displayed on a user interface.

Alternatively or additionally, data from devices 20, 50 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more devices 20, 50 when an occurrence of the defined CSS is detected in the future.

In still other embodiments, the devices 20, 50 themselves may analyze data for detection of CSSs (e.g. using the onboard circuitry 22) and define and/or take action responsive to detecting the occurrence of a defined CSS. Thus, the devices 20, 50 may operate in some cases independently of the network 30 and the application server 40. However, in some cases, the application server 40 may be used to provide defined CSSs to the devices 20, 50 and the devices 20, 50 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device may be embodied in a construction device 20, a personnel device 50, a separate computing device, or be distributed among the devices 20, 50, and/or a separate computing device. The CSS monitoring device 100 may include processing circuitry 110 of an example embodiment, as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location data) relating to a corresponding one of the devices 20, 50. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the devices 20, 50), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation of the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g. sensors that measure variable values related to device operational parameters like RPM, temperature, oil pressure, and/or the like, and/or sensors that measure device movement employing movement sensor circuitry) of the construction device 20 via the device interface 120. In one embodiment, sensors of the sensor network 140 of one or more ones of the devices 20, 50 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the devices 20, 50 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

The movement sensor circuitry (if employed) may be configured to provide indications of movement of the devices 20, 50 based on data provided by the one or more accelerometers and/or gyroscopes, and/or based on GPS or local position determining capabilities. In other words, the movement sensor circuitry may be configured to detect movement of the devices 20, 50 based on inertia-related measurements or other location determining information. In some example embodiments, the movement sensor circuitry may include orientation sensors, configured to detect the orientation of a device, particularly the working element of the device relative to the determined location.

Figure 3:
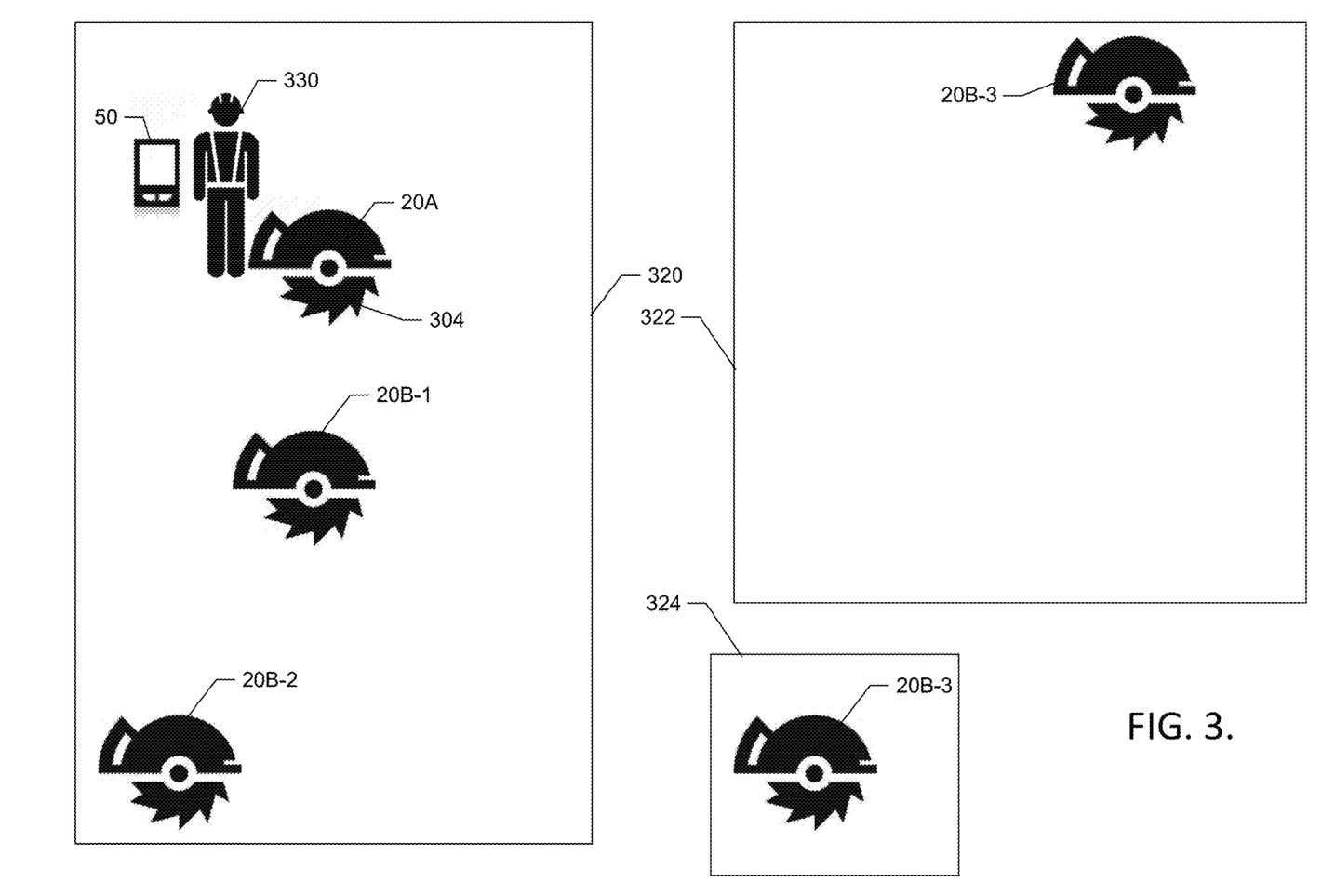
FIG. 3 illustrates an example construction site according to an example embodiment.

FIG. 3 illustrates an example construction site according to an example embodiment. The construction site 320 may include one or more construction devices 20, such as saws, drills, grinders, or the like. The construction device 20 may include a working element 304, such as a blade, drill bit, grinding head, nailer, or the like, configured to perform work such as cutting, drilling, grinding or fastening, on a working material. A CSS may include determining a substitute device 20B for a current construction device 20A based on device identifier data and/or location data associated with a plurality of construction devices 20.

In an example embodiment, a construction site 320 may include a plurality of construction devices 20. The CSS monitoring device 100 may receive device identifier data, e.g. device identifiers, from the respective construction devices 20. The device identifiers, may include data indicative of the make/model, specific device type, generic device type, or the like of a construction device 20, for example Husqvarna DM-230, Core Drill, Drill, or the like.

The CSS monitoring device 100 may also receive location data from the respective construction devices 20. The location data may be an actual location or proximate location, derived from a location sensor, such as a portion of the sensor network 140, associated with the respective construction devices 20.

The CSS monitoring device 100 may determine a substitute device 20B based on the device identifier data and/or the location data associated with the construction devices 20. The CSS monitoring device 100 may determine a substitute device 20B based on the device identifier data, such as exact matches of the make/model data, and/or matches of the specific device type, or generic device type. In some embodiments, the substitute device 20B may be determined based on the most specific device identifier data match, e.g. make/model, specific device type, then generic device type. In the above example, a second construction device 20B-2 including device identifier data of Husqvarna DM-230, may be selected as the substitute device 20B. In the absence of a make model/match, construction device 20B-1 associated with a device identifier data Husqvarna DM-220, Core Drill, Drill, may match the specific device type and be the next preferred substitute device 20B. In the absence of either a make/model match or a specific device type match, a generic device type match, e.g. drill, would be determined as the substitute device 20B. In the following examples, a "superior device" is a device which includes at least one more specific device identifier data match relative to a "subordinate device."

In some example embodiments, the CSS monitoring device 100 may use the location data to identify the substitute device 20B, for example the proximity to the current construction device 20A. In some instances, proximity thresholds, e.g. predetermined radii, such as 500 ft, 1000 ft, or the like, from the current construction device 20A may be used to determine the substitute device 20B. In an example embodiment, a subordinate device identifier data match may be determined to be the substitute device 20B within a first, small, radius, over a superior, e.g. more specific device identifier data match in a second or third larger radii. Continuing the example above, a construction device 20B-1 with a device identifier data of Husqvarna DM-220, Core Drill, Drill in the first radius, e.g. 500 ft around the current construction device 20A, may be determined to be the substitute device 20B over a construction device 20B-2 in a second radius, e.g. 500-1000 ft, with a device identifier data of Husqvarna DM-230, Core Drill, Drill.

In some example embodiments, the device identifier data and location data may be received from construction devices 20 which is in data communications with the network 30 which in some instances may be remote from the construction site 320. In some examples the remote locations may include remote or neighboring construction sites 322, a neighbor's garage, a construction vehicle, or retail locations 324. In some example embodiments, the proximity thresholds may be defined by the locations, for example the first proximity threshold may be the local construction site 320, the second proximity threshold may be remote or neighboring construction sites 322, and a third proximity threshold may be retail locations 324.

In some example embodiments, the CSS monitoring device 100 may receive sensor data from the construction devices 20. The sensor data may be indicative of a construction device 20 operational condition, such as fully operational, limited operation, or removed from operation. The sensor data may be indicative of limited operation in an instance in which a scheduled maintenance parameter is satisfied, such as run hours, a diagnostic warning, or in an instance in which one or more sensors indicate reduced performance. Some examples of sensor data indicative of reduced performance may include, without limitation, an increase in temperature, operation intervals, or force applied to the construction device, which may be indicative of a dull blade or drill bit, reduced engine efficiency, or the like. The sensor data may be indicative of removed from operation in an instance in which a component failure is detected, such as a chain break, piston seizure, or the like; or an automatic shutdown, such as high temperature of the motor, working element 304, or the like. Additionally or alternatively, the operational status may include "in use," "idle," "available," or the like, which may enable the construction site status monitoring device to determine substitute devices based on current use and/or operability of the construction devices 20. The CSS monitoring device 100 may determine a substitute device 20B based on construction devices 20 which are associated with sensor data indicative of a fully operational and/or available construction device, over limited operation and/or idle construction devices 20. The CSS monitoring device 100 may exclude removed from service and/or in use construction devices 20.

Additionally or alternatively, the CSS monitoring device may determine a substitute device 20B based on an operator defining selection parameters, such as closest construction device 20 which matches the specific device type, make/model match within the construction site 320, or the like.

In an example embodiment, the location data associated with the substitute device 20B may be displayed on a user interface 130 associated with the construction device 20, a personnel device 50, or the CSS monitoring device 100 for use by the operator 330. In some example embodiments, the location data associated with the substitute device 20B may be displayed based on a request by the operator 330, such as a selection in a CSS monitoring program or application running on the CSS monitoring device 100 or personnel device 50.

Additionally or alternatively, the location data associated with the substitute device 20B may be displayed automatically based on sensor data associated the construction device 20A. The CSS monitoring device 100 may automatically cause the location data of the substitute device 20B to be displayed in an instance in which the construction device 20A sensor data indicates an operational status of limited operation and/or removed from service.

In some example embodiments, the CSS monitoring device 100 may cause the location data of other construction devices 20 which matches at least a portion of the device identifier data of the current construction device 20A and which have not been selected as the substitute device 20B to be displayed. In an example embodiment, construction devices 20 which include sensor data such as in use, limited operation, idle, or removed from service; which are beyond a proximity threshold; which have a subordinate device identifier data match; or the like may be displayed. In some example embodiments, the location data associated with all of the construction devices 20 which match at least a portion of the device identifier data of the current construction device 20A and which have not been selected as the substitute device 20B may be displayed.

Figure 4:
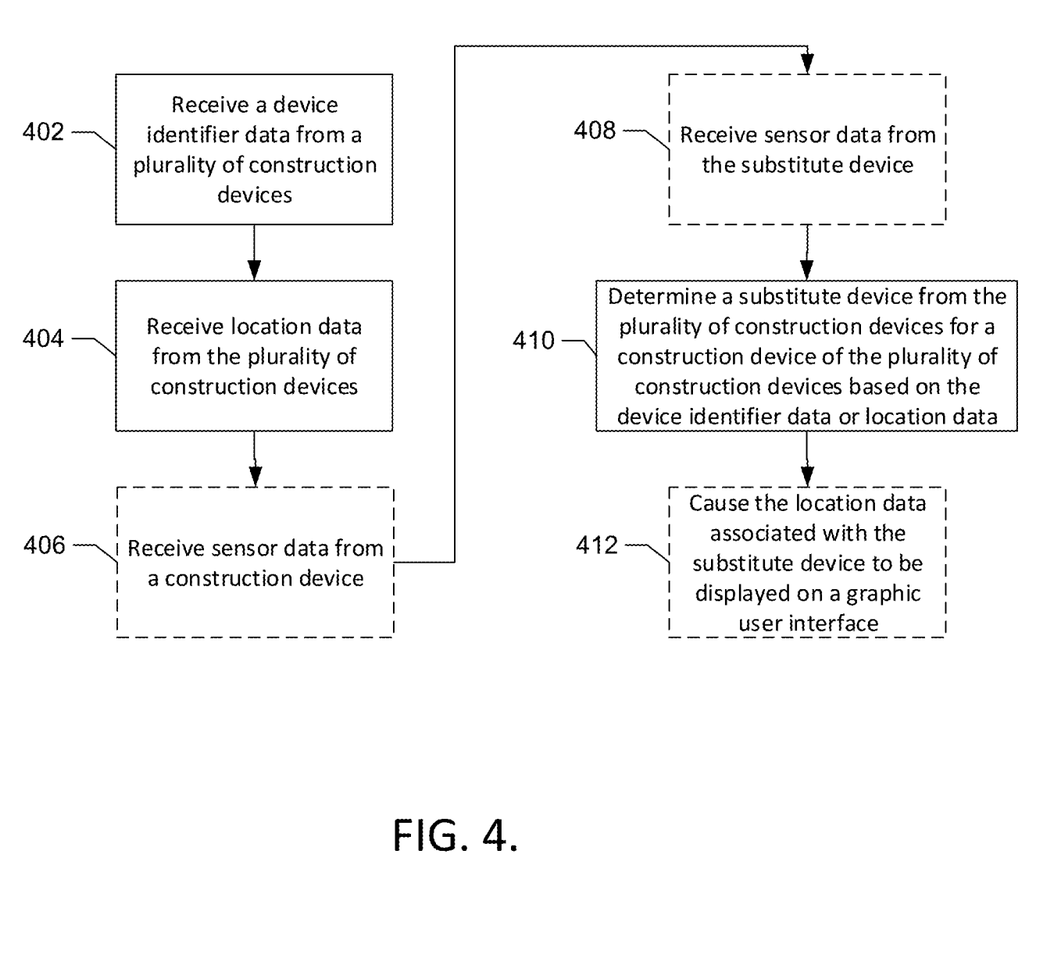
FIG. 4 illustrates a method of utilizing construction site status monitoring device in relation to operation of construction device according to an example embodiment.

In some cases, a method of utilizing CSS analysis in relation to operation of the CSS monitoring device 100 and/or one or more construction devices 20 according to an example embodiment may be provided. FIG. 4 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving device identifier data from a plurality of construction devices at operation 402, receive location data from the plurality of construction devices at operation 404, and determining a substitute device from the plurality of construction devices for a construction device of the plurality of construction devices based on the device identifier data or location data at operation 410.

In some embodiments, the method may include additional, optional operations, and/or the operations described above may be modified or augmented. Some examples of modifications, optional operations, and augmentations are described below, as indicated by dashed lines, such as, receiving sensor data from the construction device at operation 406, receiving sensor data from the substitute device at operation 408, and causing the location data associated with the substitute device to be displayed on a user interface at operation 412.

In an example embodiment, the CSS monitoring device may comprise a processor (e.g. the processor 112) or processing circuitry 110 configured to perform some or each of the operations (402-412) described above. The processor 112 may, for example, be configured to perform the operations (402-412) by performing hardware implemented logical functions, executing stored instructions, or executing algorithms for performing each of the operations. In some embodiments, the processor 112 or processing circuitry 110 may be further configured for additional operations or optional modifications to operations 402-412. In this regard, in an example embodiment, the initiating event is an operational condition of limited operation or a removal from service of a construction device. In an example embodiment, the initiating event is sensor data indicative of a failure of a construction device. In some example embodiments, the initiating event is sensor data indicative scheduled maintenance. In an example embodiment, the construction device availability request indicates a location associated with a construction device associated with the initiating event and the construction device availability response is based on a determination of the closest device of the device type to the location of the construction device associated with the initiating event. In some example embodiments, the status information is indicative of an operational condition of the available construction device. In an example embodiment, the construction device availability response is determined based on stored information. In some example embodiments, the construction device availability is determined based on dynamic or real time status information. In an example embodiment, the initiating event is determined by the first construction device. In an example embodiment, the initiating event is determined by the construction site status monitoring device. In some example embodiments, construction site status monitoring system also includes at least one personnel device and the initiating event is indicative of a user request received by the at least one personnel device.

FIG. 5A-5D illustrate data flowcharts of a construction site status monitoring device according to an example embodiment. In the example depicted in FIG. 5A, the CSS monitoring device 100 may receive sensor data S1 from the construction device 20. The sensor data may be indicative of the operational condition or scheduled maintenance of the construction device, as discussed above in reference to FIG. 3. In some example embodiments a user request from a personnel device 50 or the construction device 20 of construction device availability may be receive by the CSS monitoring device 100 in addition to, or as an alternative to, the sensor data.

Figure 5A:
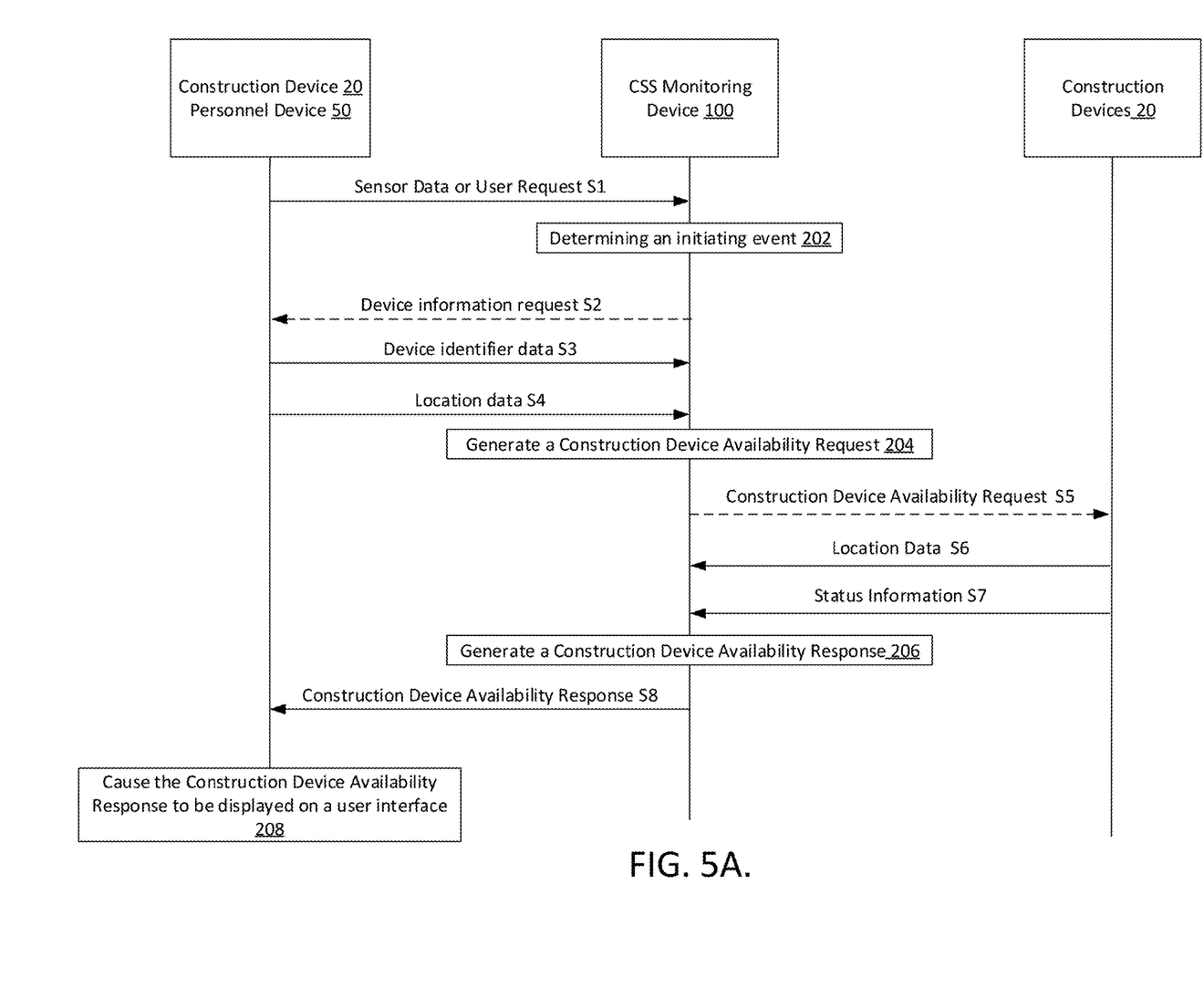
FIG. 5A-5D illustrate data flowcharts of a construction site status monitoring device according to an example embodiments.

The CSS monitoring device may determine an initiating event based on the sensor data and/or user request at operation 202. The initiating event may be an operational condition indicative of limited operation or removal from service; a failure; or scheduled maintenance; of the construction device 20. In some example embodiments, the user request may serve as the initiating event.

The CSS monitoring device 100 may receive a device identifier data (S3) and location data (S4) from the construction device 20. The device identifier data and or location data may be continuously received, by the CSS monitoring device 100, received periodically, or received in response to a device information request S2.

The CSS monitoring device 100 may generate a construction device availability request 204 in response to the initiating event. The construction device availability request may include at least the device type of the construction device 20 associated with the initiating event. In some example embodiments, the construction device availability request may include information indicative of the location of the construction device 20. The CSS monitoring device 100 may cause a transmission of the construction device availability request S5. The construction device availability request may be received by one more construction devices 20, such as construction device 20B-1 and 20B-2 within the construction site 320, construction device 20 B-3 in a neighboring construction site 322, or construction device 20B-4 in a retail location 324.

The CSS monitoring device 100 may receive location data (S6) and status information (S7) from one or more of the construction device 20 which match the device type of the construction device 20 associated with the initiating event. The status information may be indicative of the operational status and/or availability of the construction device 20. The location data and status information may be received periodically, continuously, or in response to a construction device availability request S5.

The CSS monitoring device 100 may generate a construction device availability response 206 including the location data and status information of at least one available construction device, e.g. substitute device 20B, based on the construction device availability request. In some instances, the construction device availability response may be based on the determination of the closest device of the device type to the location of the construction device 20 associated with the initiating event, as discussed above in reference to FIG. 3.

The construction device availability response may be received by the construction device 20 and/or the personnel device 50. The construction device and/or personnel device 50 may cause the construction device availability response, e.g. substitute construction device 20B location and status information to be displayed on a user interface 130, as described above.

Figure 5B:
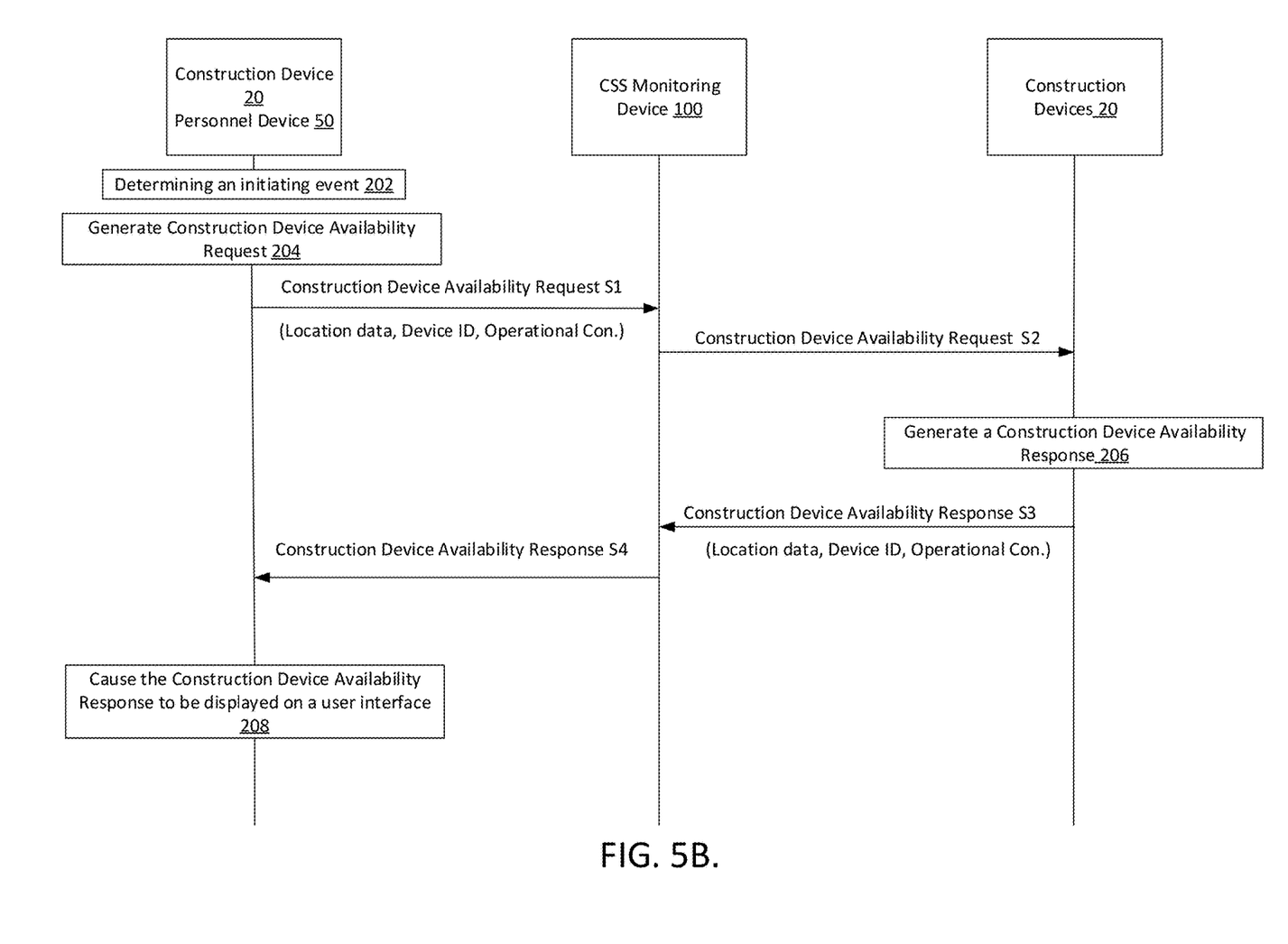

In the example depicted in FIG. 5B, the construction device 20 or personnel device 50 may determine the initiating event 202 and generate the construction device availability request 204. The CSS monitoring device 100 may receive the construction device availability request S1 from the construction device 20 and/or personnel device 50, including location data, device identifier data, and/or an operational condition associated with the construction device 20 associated with the initiating event. Construction devices 20 may receive the construction device availability request S1 from the construction devices directly or receive the construction device availability request S2 via the CSS monitoring device 100. The construction devices 20, which match the device type, may generate construction device availability responses 206 based on receiving a construction device availability request. The construction device availability response may include the location data, device identifier data, and/or operational condition of the respective construction device 20.

The construction device 20 and/or personnel device 50 may receive the construction device availability response S3 from the respective construction devices 20 or receive the construction device availability response S4 via the CSS monitoring device 100. The construction device 20 and/or personnel device 50 may cause the construction device availability response to be displayed on a user interface 130, at operation 208.

Figure 5C:
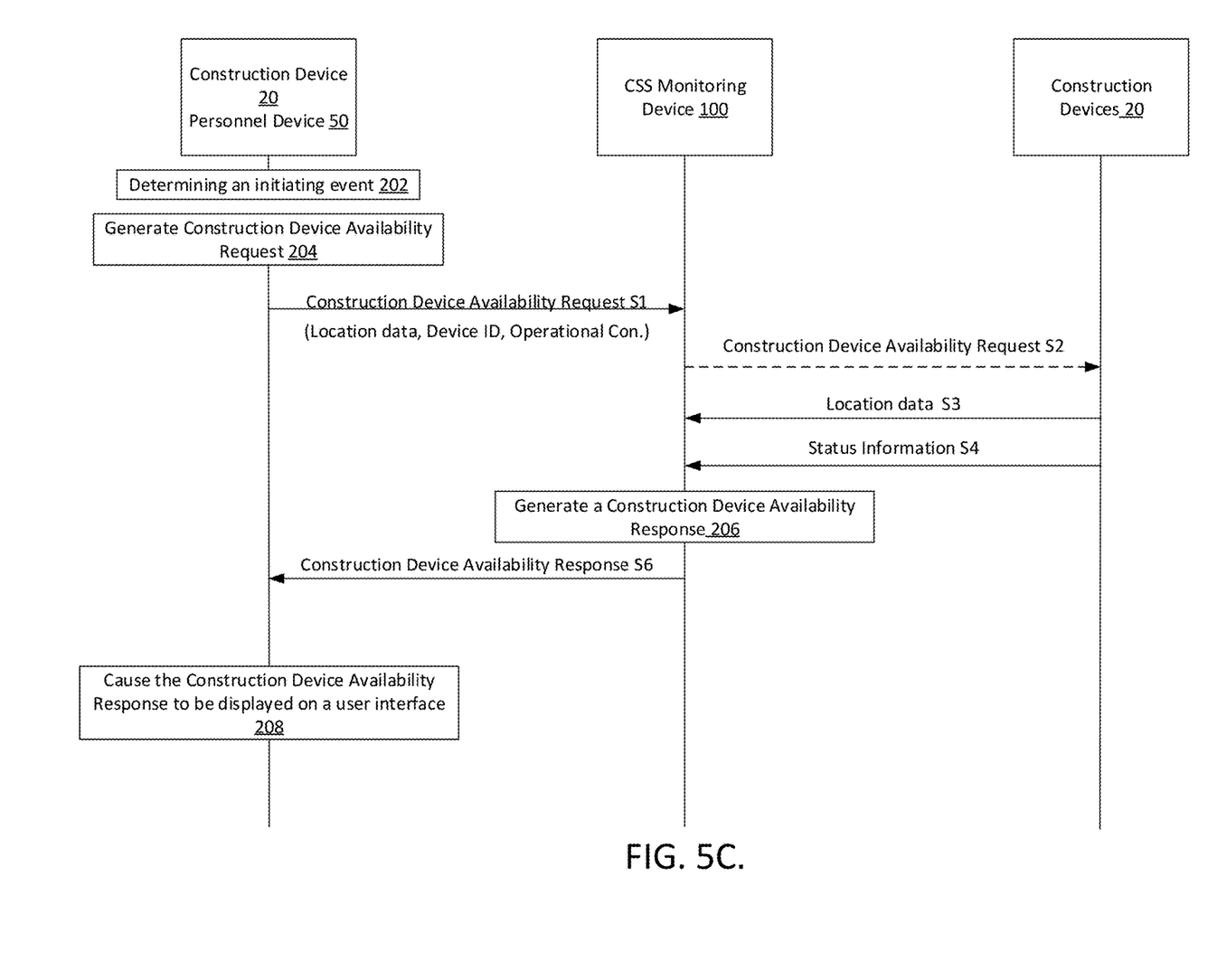

In the example depicted in FIG. 5C, the CSS monitoring device 100 may receive the construction device availability request S1 from the construction device 20 and/or personnel device 50, as described above in reference to FIG. 5B. The CSS monitoring device 100 may receive location data S3 and status information S4 as discussed in reference to FIG. 5A. The location data and status information may be received periodically, continuously, or in response to a receiving a construction device availability request (S2) from the CSS monitoring device 100.

The CSS monitoring device 100 may generate a construction device availability response 206 as discussed above in reference to FIG. 5A. The construction device 20 and/or personnel device 50 may receive the construction device availability response S8 from the CSS monitoring device 100. The construction device 20 and/or personnel device 50 may cause the construction device availability response to be displayed on a user interface 130, at operation 208.

Figure 5D:
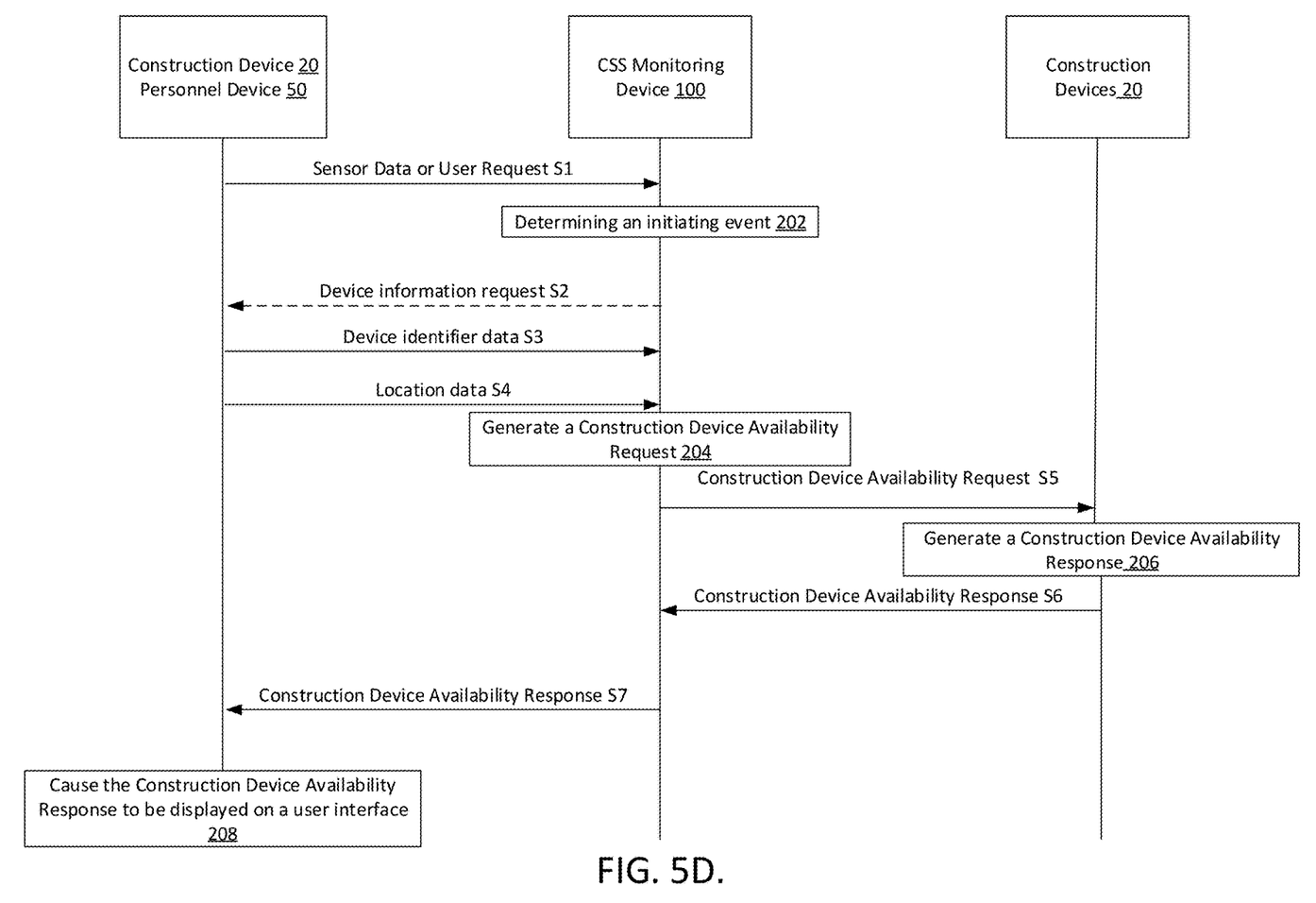

In the example depicted in FIG. 5D, the CSS monitoring device 100 may determine an initiating event 202 based on sensor data or a user request S1 received from the construction device 20 or personnel device 50.

The CSS monitoring device 100 may generate a construction device availability request 204 based on the device identifier data S3, and location data S4. The device identifier data and location data may be receive periodically, continuously, or in response to a device information request S2, from the CSS monitoring device 100.

The construction devices 20 may receive a construction device availability request S5 and generate a construction device availability response 206. The construction device 20 and/or personnel device 50 may receive the construction device availability response S6 from the respective construction devices 20 or receive the construction device availability response S7 via the CSS monitoring device 100. The construction device 20 and/or personnel device 50 may cause the construction device availability response to be displayed on a user interface 130, at operation 208.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A construction site status monitoring device comprising processing circuitry configured to:
   receive device identifier data from a construction device operating in a worksite;
   receive location data from a movement sensor of the construction device;
   generate, in response to an initiating event, a substitute construction device availability request for the construction device, the substitute construction device availability request comprising an indicator of the device identifier data and the location data of the construction device;
   receive a construction device availability response from each of a plurality of available construction devices, each construction device availability response comprising device type, location data, and status information of each of the plurality of available construction devices wherein the plurality of available construction devices excludes construction devices removed from service or already in use in the worksite;

determine a substitute construction device for the construction device from the plurality of available construction devices based on a comparison of the device type, the location data, and the status information of each of the plurality of available construction devices to the device identifier data and the location data of the construction device; and cause the location data of the substitute construction device to be displayed on a user interface of the construction device or a device associated with personnel operating the construction device.

2. The construction site status monitoring device of claim 1, wherein the initiating event is an operational condition of limited operation or a removal from service of a the construction device.

3. The construction site status monitoring device of claim 1, wherein the initiating event is sensor data indicative of a failure of the construction device.

4. The construction site status monitoring device of claim 1, wherein the initiating event is sensor data indicative of scheduled maintenance.

5. The construction site status monitoring device of claim 1, wherein the status information is indicative of an operational condition of each of the plurality of available construction devices.

6. The construction site status monitoring device of claim 1, wherein the construction device availability response is determined based on stored information.

7. The construction site status monitoring device of claim 1, wherein the plurality of available construction devices is determined based on dynamic or real time status information.

8. A construction site status monitoring system comprising:
a plurality of construction devices; and
a construction site status monitoring device comprising processing circuitry configured to:
receive device identifier data from a first construction device operating in a worksite out of the plurality of construction devices;
receive location data from a movement sensor of the first construction device;
generate, in response to an initiating event, a substitute construction device availability request for the first construction device, the substitute construction device availability request comprising an indicator of the device identifier data and the location data associated with the first construction device;
receive a construction device availability response from each remaining construction device of the plurality of construction devices, each construction device availability response comprising device type, location data, and status information of each of the remaining construction devices, wherein the remaining construction devices exclude construction devices removed from service or already in use in the worksite;
determine a substitute construction device for the first construction device from the remaining construction devices of the plurality of construction devices based on a comparison of the device type, the location data, and the status information of each of the remaining construction devices to the device identifier data and the location data of the first construction device; and
cause the location data of the substitute construction device to be displayed on a user interface of the first construction device or a device associated with personnel operating the first construction device.

9. The construction site status monitoring device of claim 8, wherein the initiating event is sensor data indicative of a failure of -a the first construction device.

10. The construction site status monitoring device of claim 8, wherein the initiating event is sensor data indicative of scheduled maintenance of the first construction device.

11. The construction site status monitoring device of claim 8, wherein the status information is indicative of an operational condition of each of the remaining construction devices.

12. The construction site status monitoring device of claim 8, wherein the construction device availability response is determined based on stored information.

13. The construction site status monitoring device of claim 8, wherein the initiating event is an operational condition of limited operation or a removal from service of the first construction device.

14. The construction site status monitoring system of claim 8, wherein the initiating event is determined by the first construction device.

15. The construction site status monitoring system of claim 8, wherein the initiating event is determined by the construction site status monitoring device.

\* \* \* \* \*